June 30, 1964 D. H. PROSSER 3,138,812
LOADING RAMP CONTROL
Filed March 30, 1962 6 Sheets-Sheet 1

United States Patent Office 3,138,812
Patented June 30, 1964

3,138,812
LOADING RAMP CONTROL
David Howard Prosser, 500 Allenby Ave.,
Pittsburgh, Pa.
Filed Mar. 30, 1962, Ser. No. 183,803
4 Claims. (Cl. 14—71)

This invention relates to an improvement in the control of loading ramps and relates in particular to an automatic control system for maintaining a support member within a predetermined distance beneath a floating, segmented loading ramp.

In the handling of materials in present day commerce, it is common practice to employ loading ramps at docks or doorways where trucks and/or railway cars are loaded or unloaded. These ramps compensate for the variations in height between the dock level and the truck or car floor level. The position of the vehicle floor in respect to the loading dock is dependent on the skill of the driver, the size of the vehicle and the relative height of the vehicle in respect to the dock.

Conventional mechanically or hydraulically operated loading ramps consist of rectangular shaped platforms that are hinged along one edge to stationary platforms. The free edge of these platforms may be elevated or lowered to compensate for truck floors of varying elevation. These ramps are generally provided with an apron or tongue which extends beyond the free edge of the ramp and which is positioned to rest on the floor of the truck. Many ramps may be extended horizontally so that their free edge or tongue can contact a vehicle in close proximity to the loading dock or platform.

Loading ramps may be classified as floating or self supporting. The floating ramp is supported at one end by the loading dock (or supporting frame if the ramp is extensible) and the other end by the truck floor where the lip (or extended portion of the ramp) comes to rest. With this arrangement the ramp is said to be floating between the truck floor and the dock or other supporting members. On the other hand a self supporting loading ramp is one in which the lip of the ramp may touch the truck floor but the ramp itself is wholly supported by its own supporting members.

Segmented "free-floating" ramps are preferred because the individual segments follow the vehicle floor which may raise and lower unevenly. For example, when loading or unloading a truck one side may become heavier than the other side in which event the truck will list to the heavier side. A rigid ramp will bear on the up side of the truck floor leaving a space between the lip of the ramp and the truck floor on the down side of the listing truck that may not be easily traversed. Each segment of a segmented ramp will follow the listing surface of the truck floor minimizing any such unevenness. The main disadvantage of such a segmented "free-floating" ramp is that should the truck for any reason move away prematurely, which occasionally happens through carelessness of the driver, the ramp segments crash to the ground causing damage to the ramp and the structures beneath it as well as anything which may be on the ramp at this time.

The control system of the present invention serves to elevate and lower a segmented ramp and to maintain an elongated support member positioned transversally beneath the ramp at a predetermined distance beneath all of the segments of the ramp while it is floating between a dock and a vehicle floor even when the segments are contacting a listing vehicle floor so that should the vehicle pull away for any reason each segment will fall onto the transverse member a predetermined distance that may be such a fraction of an inch that damage will not occur to the ramp or its associated mechanisms or anything on the ramp at such time.

It is, therefore, the object of the present invention to provide a control system for maintaining a support member beneath the segments of a segmented loading ramp within a predetermined distance of said segments even where they are contacting a listing vehicle.

It is also an object of the present invention to provide a control system for elevating and lowering a segmented loading ramp and to automatically maintain a support member beneath the segments of a segmented ramp within a predetermined distance of said segments even where the segments are contacting a listing vehicle.

It is a still further object of the present invention to provide a control system for raising and lowering a segmented extensible and retractable loading ramp and to extend or retract the extensible and retractable features of the ramp and to automatically maintain a support member beneath the segments of the segmented ramp within a predetermined distance of said segments even where the segments are contacting a listing vehicle.

Figure 8:
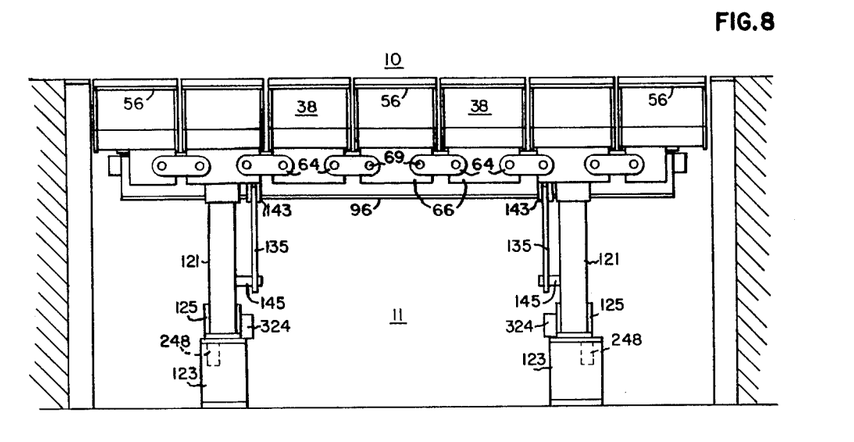
FIG. 8 is an end elevation view of the loading ramp of FIG. 1 shown in its "at rest" position (as in FIG. 4).
Figure 9:
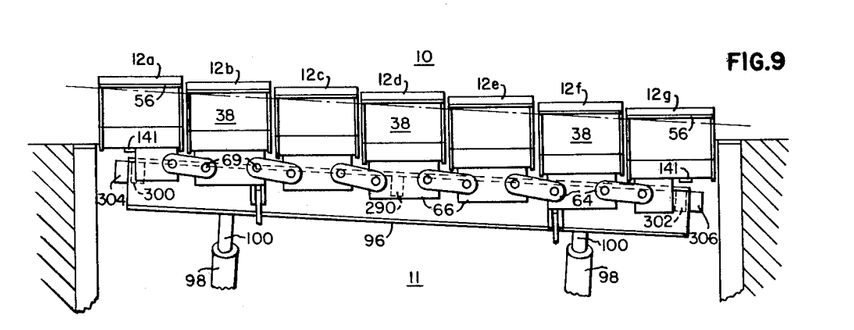
FIG. 9 is an end elevation view of the loading ramp of FIG. 1 shown in its "free-floating" position.
Figure 10:
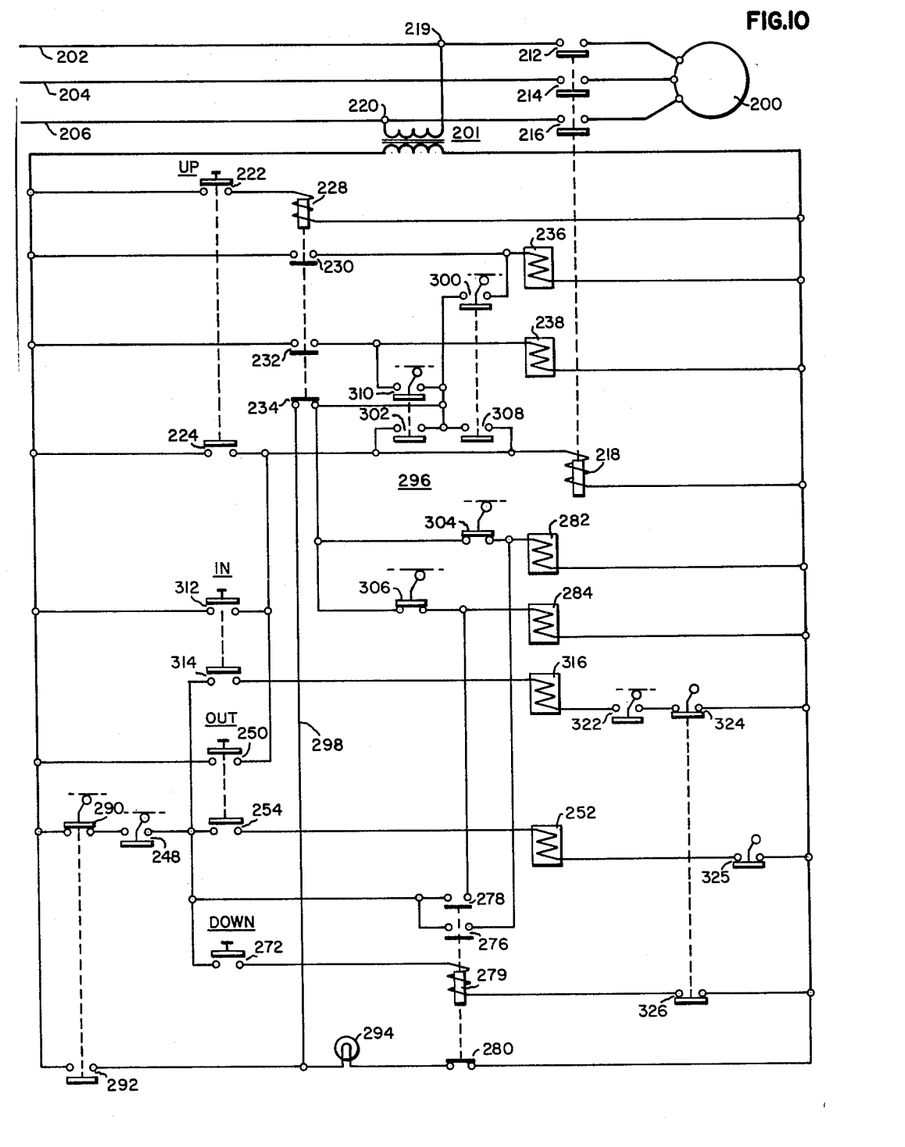
FIG. 10 is a schematic representation of a control system for the operation, both manual and automatic, of the ramp of FIGS. 1 through 9.
Figure 11:
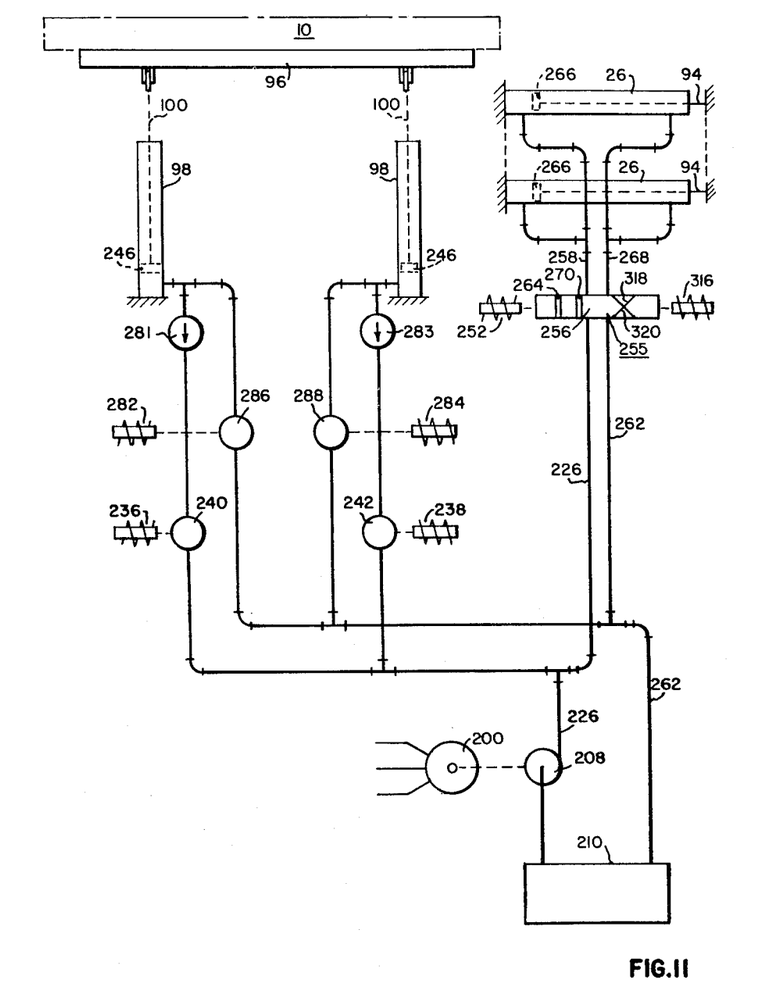
FIG. 11 is a schematic representation of the hydraulic system for the operation, both manual and automatic, of the ramp of FIGS. 1 through 9 which is controlled by the system of FIG. 10.

Other advantages and advantageous features of the present invention will be obvious from the following specification and drawings wherein FIGURES 1 through 9 and their description relate to a segmented, extensible and retractable loading ramp to which the control system of the present invention applies and FIGURES 10 and 11 illustrate the electric and hydraulic control system of the present invention.

Figure 3:
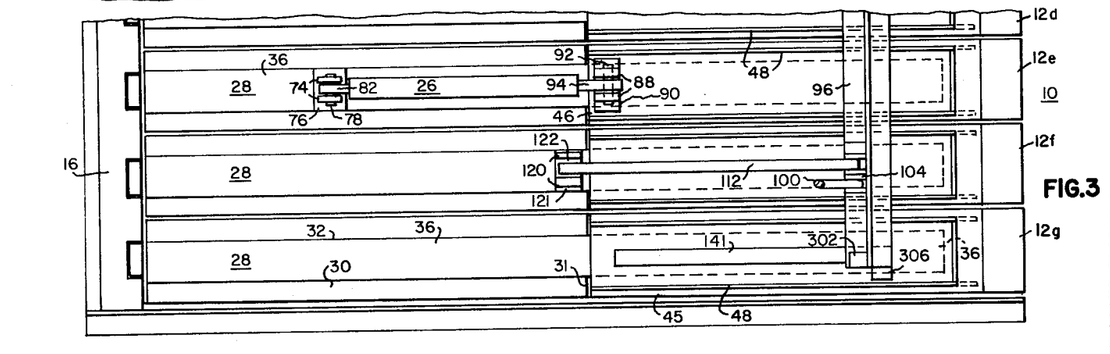
FIG. 3 is a bottom plan view of the broken away portion of the ramp of FIG. 1, also showing segments 12e, 12f and 12g plus a portion of segment 12d.
Figure 4:
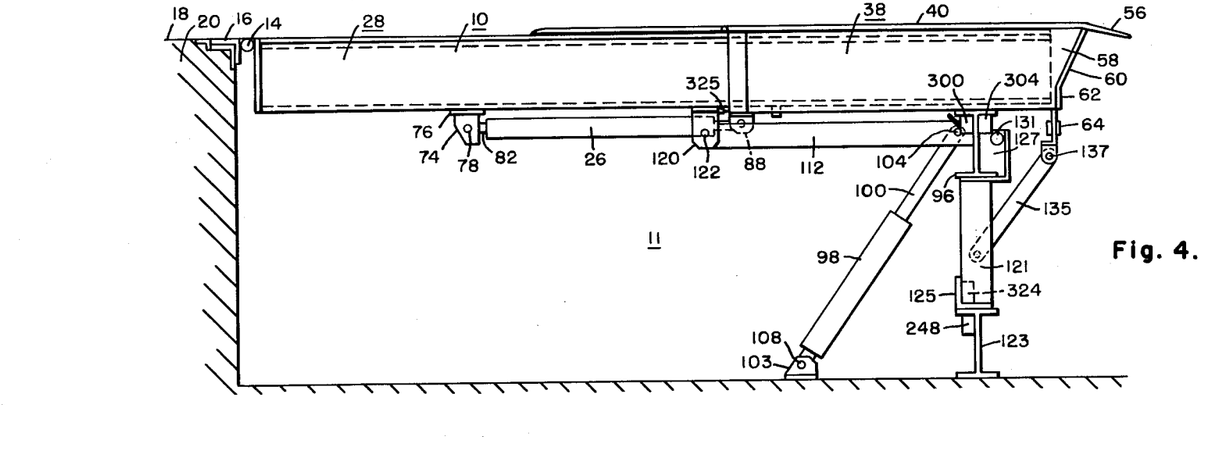
FIG. 4 is a side elevation view of the loading ramp of FIG. 1, shown in its horizontal "at rest" position (the dock pit being in cross section).

In the drawings there is shown a loading ramp 10 positioned within a dock pit 11 (see FIGS. 4 and 5) which consists of a depression within the loading dock 20. The pit 11 is lined on either side with angle curbs 13. The loading ramp 10 comprises a number of individual segments 12 (12a, 12b, 12c, 12d, 12e, 12f and 12g). Each segment 12 is individually hinged as shown at 14 (FIGS. 1–5) to a rear angle frame 16, appropriately imbedded in the rear of the concrete dock 20 to permit pivoting of each segment 12 and allowing proper positioning of the free end of the ramp 10. FIG. 4 shows the ramp 10 in its horizontal "at rest" position in respect to the loading surface 18 of dock 20. Each of the segments 12 are formed of beam members 28 and sleeve shaped members 38.

The members 28 are hinged to the dock 20 as shown at 14 and the sleeve shaped members 38 are disposed to slide over and telescope outwardly on members 28. It should be noted that the ramp segments 12c and 12e are the segments shown by FIG. 1 to carry the power means (rams 26) for extending and retracting the extensible features of the ramp 10.

Figures 1, 6, 7:
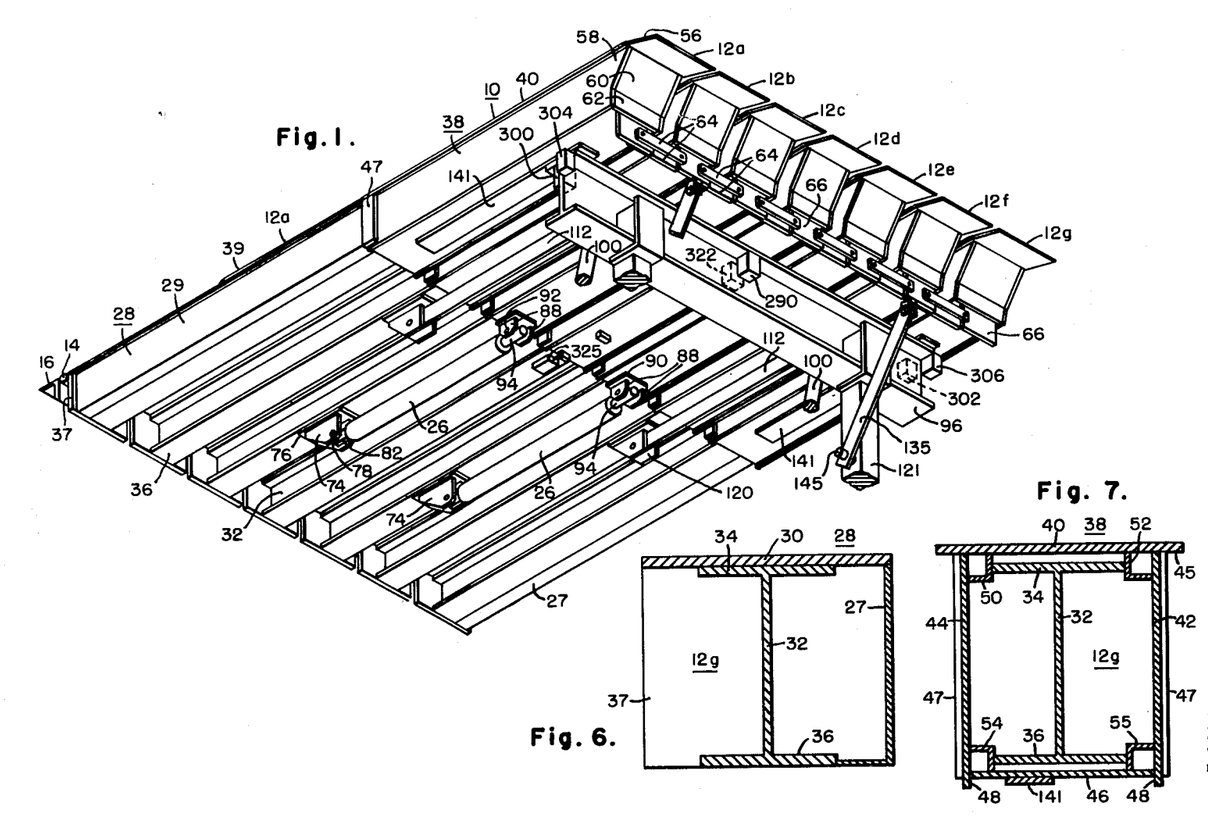
FIGURE 1 is a bottom perspective view showing a segmented, extensible and retractable loading ramp.
FIG. 6 is a cross sectional view of segment 12g of the ramp as taken along line VI—VI of FIGURE 2.
FIG. 7 is a cross sectional view of segment 12g of the ramp 10 taken along line VII—VII of FIGURE 2.
Figure 2:
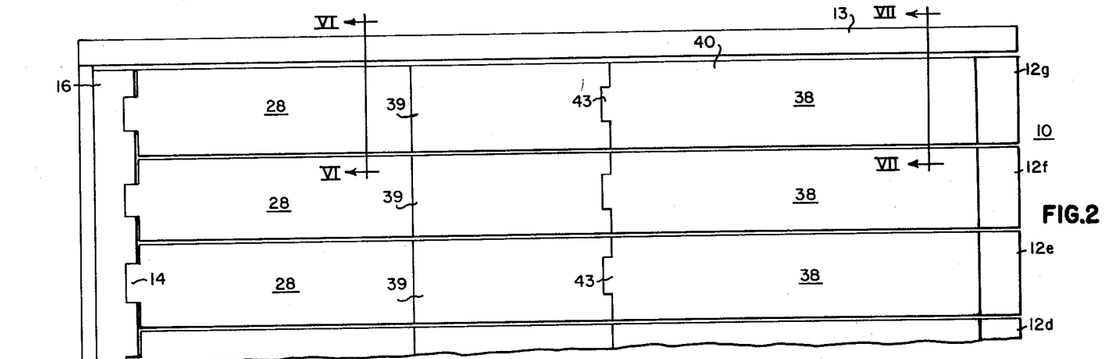
FIG. 2 is a top plan view of a broken away portion of the ramp of FIG. 1 showing segments 12e, 12f and 12g and a portion of segment 12d.

FIG. 6 is a cross sectional view of the ramp segment 12g taken along line VI—VI of FIG. 2. It is understood that each of the segments are constructed in a substantially identical manner, the only exceptions being the attached power means such as rams 26 which are attached to segments 12c and 12e and the bumper stabilizing arms 112 which are attached to segments 12b and 12f. The power means and bumper stabilizing arms may, of course, be attached to any of the segments 12. Preferably there is a balanced relationship. For example, if ram 26 is installed on any but the center segment 12d a balancing ram would preferably be installed on the corresponding segment on the other side of the center segment.

The cross section of FIG. 6 shows that member 28 of segment 12g is formed of a deck plate 30 attached to an I beam 32. As shown by FIG. 3 the deck plate 30 terminates as shown at 31 while I beam 32 projects into the sleeve shaped member 38.

Positioned as telescoped over beam members 28 are the rectangular sleeve shaped members 38. FIG. 7 is a cross sectional view of the sleeve member 38 of segment 12g of FIG. 2 taken along the line VII—VII thereof. Sleeve members 38 are shown to be formed with a deck plate 40, side members 42 and 44 and a bottom plate 46. Deck plate 40, side members 42 and 44 and bottom plate 46 are all attached to form sleeve shaped member 38. It is to be noted that side members 42 and 44 extend slightly beyond bottom plate 46 as shown so as to form slide surfaces 48 whose function will be explained hereafter. FIG. 7 shows I beam 32 of member 28 positioned within sleeve shaped member 38. There is also shown angle bars 50 and 52 which are attached to either side of flanges 34 of I beam 32 and which provide bearing surfaces upon which side members 42 and 44 and deck plate 40 of sleeve members 38 may slide. Likewise angle bars 54 and 55 are shown attached to either side of the bottom flange 36 of I beam 32 so as to space flange 36 from bottom plate 46 and side members 42 and 44 of sleeve shaped member 38 and provide suitable slide surfaces between members 28 and sleeve members 38. Angle members 50, 52, 54 and 56 only extend from the end of deck plate 30 (at 31) to the end of members 28 since this is the only area in which sleeve shaped members 38 project over and slide upon the members 28 of the segments 12a–12g. Since the sleeve members 38 slide in and out on members 28 the arrangement of slide angle bars 50, 52, 54 and 56 effectively reduce friction by providing a reduced sliding surface and hence, effect a reduction in the friction that would occur if deck plates 30 and 40 or bottom plate 46 and flange 36 were permitted to slide on one another.

Figure 5:
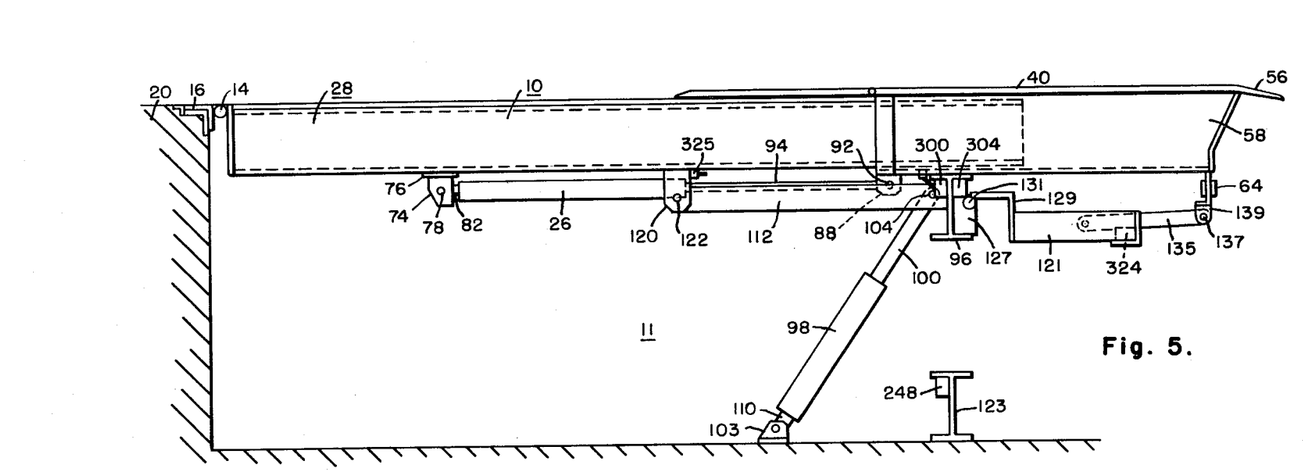
FIG. 5 is a side elevation view of the ramp of FIG. 1 shown in an extended position (the dock pit being in cross section).

Each of the deck plates 40 of sleeve members 38 are shown to extend beyond the free ends of sleeve members 38 so as to form a vehicle floor contacting lip as shown at 56 (FIGS. 1, 4 and 5). Also, side members 42 and 44 extend at an angle to provide additional strength to lip 56 as shown at 58. End plates 60 and 62 (FIGS. 1 and 4) complete the sleeve shaped structure, add strength to the member and limit the distance that sleeve members 38 will slide over members 28. End plates 60 and 62 are attached to sleeve members 38. Deck plates 40 overlap side members 42 and 44 as shown at 45 (FIG. 7). Members 47 are attached to either side of side members 42 and 44 and to deck plate 40 to provide additional strength to sleeve members 38. End plates 37 (FIGS. 1, 6 and 7) are attached to the back of members 28 to add strength to this structure. Angle plates 29 and 27 (see particularly FIGS. 1 and 6) serve to cover the exposed I beams 32 of outer segments 12a and 12g and act as a safety guard to keep the area between deck plate 30 and the dock surface 18 clear when raising and lowering the ramp.

Deck plates 30 terminate as shown at 31 at the place where I beam 32 of members 28 project into sleeve members 38 while the ramp is in its retracted position. A cover plate 39 (FIG. 2) is attached to each of the deck plates 40 to cover up the spaces that would appear between the I beam 32 of the segments 12 which would be exposed when the sleeve members 38 are extended on the members 28. Cover plates 39 are hinged to deck plates 40, as shown at 43 (FIG. 2), so that upon the application of weight to the ramp segments 12 the cover plate 39 will not tend to buckle upwards and interfere with the continuity of the ramp surface.

As shown particularly in FIGS. 1, 8 and 9 each of the segments 12 are linked together to form ramp 10 by links 64. A bracket plate 66 is attached to each of bottom plates 46 of sleeve members 38 so as to extend beneath each of the sleeve members 38 of segments 12. A pair of links 64 are pivotally attached on either side of each bracket plate 66 by means of pivot pins 69 so that a pair of such links pivotally connect each segment 12 to its adjacent segments. The end segments 12a and 12g require only one pivotal connection of links 64 since there is only one adjacent segment. In this manner the segments 12 through sleeve members 38 and links 64 are linked together so as to form a single ramp unit. As will be shown herebelow the sleeve members 38 are linked together in such a manner that they may slide on I beam 32 of members 28 uniformly as a single unit but the ramp, though linked together as a single unit, is segmented so that when lips 56 of segments 12 contact an uneven truck floor or platform, one segment 12 may be further depressed than its neighbor so as to compensate for the unevenness (see FIG. 9).

It will be appreciated that the links 64 will not permit the segments 12 to follow a vehicle floor (as shown in FIG. 9) unless a certain flexibility in each segment permits the segments to come closer together when such a position is required. It has been discovered, however, that the flexibility of materials, such as steel, that are ordinarily employed for such applications and the tolerances of hinges 14 permit the segments 12 to assume such a position without a noticeable change in the ramp dimensions.

The ramp in its "at rest" position is shown by FIG. 8, the links 64 are substantially parallel since each of the segments 12a through 12g are substantially parallel. In FIG. 9, however, the ramp is shown in its "free-floating" position as where in contact with an uneven truck floor and each segment is stepped down from its adjacent segments and yet is connected to the adjacent segments through the links 64 though the segments are no longer aligned.

Rams 26 are hydraulically operated cylinders that are attached to the flanges 36 of the sections 12c and 12e of the ramp segments 12 by means of a pair of flanges 74 which are attached to supporting plates 76, which are in turn attached to flanges 36 of segments 12c and 12e and also through eye members 82 attached to the rear of rams 26. Eye members 82 project between flanges 74 where they are pivotally secured to the flanges 74 by pins 78. The plungers 94 of each ram 26 are attached to similar bracket members which are composed of flanges 88 which are attached to support plates 90 which are, in turn, attached to bottom plates 46 of sleeve members 38 of the segments 12c and 12e. A pin 92 projects through perforations in the flanges 88 and eyes (not shown) in the plungers 94 of rams 26. It may be seen that when the plunger arms 94 are extended as shown in FIG. 5 the sleeve members 38 of the segments 12c and 12e and, since all the sleeve members 38 of the segments 12 are connected by links 64, all of the sleeve members 38 of segments 12a through 12g are similarly extended. Links 64 will pivot only up and down and consequently will not pivot for horizontal movement of the sleeve members 38 in respect to members 28. Consequently, all of the sleeve members 38 will slide uniformly when plunger arms 94 of rams 26 are extended or retracted. It may be seen that when plunger arms 94 of rams 26 are extended or retracted sleeve members 38 will all be extended or retracted by deck plate 40 and bottom plate 46 sliding on angle slide bars 50, 52, 54 and 55. The slide bars may, of course, be lubricated to further reduce friction. Deck plates 30 and 40 provide a uniform platform surface in either the extended or retracted position of the ramp since cover plates 39 follow deck plates 40 so as to cover the gap between deck plates 30 and 40 when the sleeve members 38 are extended.

The power means employed to raise and lower the overall ramp structure consists of a bumper beam 96 which is powered to rise by two hydraulic cylinders 98. The plungers 100 of cylinders 98 are pivotally attached to the beam 96 through a pivotal connection 104 to the end portion of stabilizer arms 112. The bottom of the hydraulic cylinders are pivotally attached to the bottom of the dock pit 11 (see FIG. 4) as by flanges 103 that are rigidly attached to the bottom of pit 11 by any conventional means (in the present instance these cylinders and flanges are attached to the bottom of the pit by the means taught in United States Patent 2,714,735). A pin 108 projects through perforations in the bracket flanges 103 and eye members (not shown) attached to the bottom of the hydraulic cylinders 98.

The beam 96 is prevented from falling into the pit by stabilizing means which consists of two pivotally mounted stabilizer arms 112 mounted on the bottom of segments 12b and 12f. The arms 112 are provided with pivotal connections consisting of flanges 120 that are attached to supporting plates 121 which are in turn attached to bottom flanges 36 of segments 12b and 12f. Flanges 120 contain perforations through which pins 122 project. Pins 122 also project through perforations (not shown) in arms 112 which extend between the flanges 120 so that these arms are pivotally connected to the non-extending portion of the ramp 10. Arms 112 are rigidly attached to beam 96 as by welding (not shown). Hence, upon extending plungers 100 beam 96 will rise ascribing an arc while arms 112 pivot at flanges 120 while the beam 96 contacts the bottom of sleeve members 38 of all the segments 12 to elevate the ramp 10. It will be observed that if the ramp 10 is lowered until lips 56 contact a truck floor the beam may be retracted into the ramp pit (see FIG. 9) and the ramp or segments are supported only at the dock 20 by hinge 14 and by the truck floor (not shown) and consequently is, in this event, a "free-floating" loading ramp. On the other hand beam 96 may be raised at any time to contact the ramp and support it even while the ramp is in use so that in this instance the ramp is self supporting.

When rams 26 are activated to extend rods 94 and sleeve members 38, the sleeve members 38 slide over beam 96 on the extensions or slide surfaces 48 of side members 42 and 44 of the sleeve members 38 so as to minimize friction that would occur if the larger surfaces of bottom plates 46 of the sleeve members 38 were to slide over the beam 96.

When the ramp 10 is not in use it is supported not only by the hydraulic cylinders 98 but also by a lock leg assembly comprising lock legs 121, which in the present embodiment consists of two solid rectangular bars which rest on a support rest (I beams 123 that are anchored to the bottom of pit 11) when the ramp is in its "at rest" position (see FIGS. 4 and 8). The lock legs 121 are provided with guard plates 125 and are pivotally connected to the bumper beam 96 by means of connecting flanges 127 which are attached to bumper beam 96 and angle members 129 which are rigidly attached to lock legs 121 but are pivotally mounted to connecting members 127 as at 131. Lock legs 121 are pivotally connected to the sleeve members 38 of segments 12b and 12f respectively by means of pivot arms 135 which are pivotally mounted to the bracket plates 66 of the respective segments 12b and 12f as shown at 137. The pivot arms 135 are pivotally mounted at their other ends to projecting bolts 145 attached to the inner surfaces of lock legs 121. Accordingly when the sleeve members 38 of the segments 12a-12g are extended by the extension of the plungers 94 of the rams 26 the lock legs 121 are lifted from the lock leg supports 123 since the pivot arms 135 are attached to sleeve members 38 of the segments 12b and 12f while the angle members 129 are pivotally mounted as at 131 to a connecting member 127 attached to the bumper beam 96 which does not extend with sleeve members 38 (see FIG. 5). Accordingly the lock legs 121 pivotally swing towards the horizontal position when the sleeve members 38 are extended and cannot interfere with the free floating features of the ramp. Of course, whenever the ramp 10 is elevated the lock legs 121 will lift from the angle beam 123 whether or not the sleeve members 38 are extended. The purpose of lock legs 121 are to provide the ramp with extra solid support while the ramp is in its retracted and lowered at rest position and avoid the possibility of a break in the continuity of the dock floor 18 and the ramp surface caused by the ramp 10 being slightly lowered or raised.

Two guard plates 141 (FIG. 1) are attached to the bottom plates 46 of segments 12a and 12g to provide a specific contact or wear surface for bumper beam 96 when the ramp 10 is being raised or lowered by the beam 96. Such plates provide more even contact between the bumper beam 96 and the bottom of segments 12a and 12g since the beam 96 does not extend to contact the outermost slide surface 48 of the sleeves 38 and if plates 141 were not provided the segments 12a and 12g would be unevenly supported when the ramp was in contact with the bumper beam 96.

In the schematic drawing of FIG. 10 it may be seen that electric motor 200 is a three phase 220 volt motor which is supplied by electric power by the leads 202, 204 and 206. Motor 200 operates pump 208 (see FIG. 11) which supplies hydraulic pressure from the reservoir 210 to the rams 26 and/or the hydraulic cylinders 98. The motor 200 runs only when switches 212, 214 and 216 (FIG. 10) are closed and these switches are all mechanically linked and are operated by solenoid 218 in the manner hereafter described. The circuit for the operation of the solenoids and limit switches operate on 110 volts A.C. power, the electric supply being taken from the leads 202 and 206 as at 219 and 220. The 220 volt A.C. current is then conducted through a transformer 201 to step down the voltage and provide 110 volt A.C. current to the system. A centralized panel (not shown) mounted conveniently adjacent to the ramp exhibits four buttons and a single light (although such panels obviously may exhibit other control lights). The four buttons are labeled "Up," "Down," "In" and "Out" and operate as shown by FIGS. 10 and 11. Assuming the ramp to be in its "at rest" position (FIGS. 4 and 8) when the Up button is depressed switches 222 and 224 are closed. Closing of switch 224 completes a circuit to solenoid 218 which closes switches 212, 214 and 216 and starts the motor 200 to operate pump 208 which supplies hydraulic pressure to hydraulic line 226. At the same time the closing of switch 222 completes a circuit to relay 228 which closes switches 230 and 232 and opens switch 234. The closing of switches 230 and 232 completes circuits to solenoids 236 and 238 which operate valves 240 and 242 respectively (FIG. 11) which permits hydraulic fluid supplied by pump 208 to flow into hydraulic cylinders 98 in back of the pistons 244 and 246 so as to cause plungers 100 to elevate the ramp 10. The opening of switch 234 serves to assure that power will not be supplied to an automatic control system when the ramp is in its "free-floating" position as will hereafter be described. As soon as the ramp commences to move upward from its "at rest" position a limit switch 248 is released and closes allowing the Down, In and Out pushbuttons to be operable as will hereinafter be described.

After the ramp has raised to the desired height (above the truck bed), the operator releases the Up button deenergizing relay 228 and opening the switches 230 and 232 causing solenoids 236 and 238 to close valves 240 and 242 permitting no further hydraulic fluid to flow into cylinders 98 but since no fluid may escape from the cylinders the ramp at this point remains stationary. Switch 234 closes so that automatic features of the ramp may take over as soon as the ramp 10 comes to its "free-floating" position and switch 224 opens to deenergize solenoid 218 and stop motor 200.

The operator may now depress the Out button which completes a circuit to solenoid 218 by closing switch 250 and activates solenoid 252 by closing switch 254 (limit switch 248 as described above is closed). Solenoid 218 restarts motor 200 to supply hydraulic fluid while solenoid 252 operates valve 255 (FIG. 11) so as to propel piston 256 to the right so that hydraulic lines 226 and 258 are contiguous with passageway 264 of the valve and hydraulic fluid may flow to the back of pistons 266 of the rams 26. Meanwhile hydraulic fluid from the front portion of ram 26 may escape through hydraulic lines 268, through passageway 270 of valve 255 to hydraulic line 262 wherein it returns to reservoir 210 for recirculation. Hence, it is seen that the rams 26 extend their plungers 94 which, as has been shown extends the sleeve members 38 of the segments 12 of ramp 10. When the Out button is released, of course, the switches 250 and 254 open and accordingly solenoids 218 and 252 are deenergized, motor 200 stops and valve 255 returns to its original position shutting off flow of hydraulic fluid to and from rams 26 and the sleeve members 38 of ramp 10 become stationary.

The ramp now, presumably is extended over the truck bed far enough to assure proper contact and the operator may depress the Down button which, as shown in FIG. 10, closes switch 272 and, since limit switch 248 is closed, energizes relay 279 which closes switches 276 and 278 and opens switch 280. By closing switches 276 and 278 solenoids 282 and 284 are energized to open valves 286 and 288 to permit hydraulic fluid to flow from hydraulic cylinders 98 through return line 262 and back to reservoir 210, thus lowering the ramp. The operator continues to keep the Down button depressed as the ramp makes contact with the truck floor. The support beam 96 continues moving downward until it is approximately ½ inch below the ramp (or other predetermined distance), where limit switch 290 is released. This limit switch breaks the circuit of the Down pushbutton, deenergizing relay 279 to open switches 276 and 278 and cause solenoids 282 and 284 to close valves 286 and 288 respectively and the hydraulic cylinders 98 will not permit bumper beam 96 to fall further. Also, the denergizing of relay 279 causes switch 280 to close and the opening of limit switch 290 causes switch 292 to close so that the circuit to light 294 is completed and light 294 lights up. Also, current is supplied to the conductor 298. Light 294 is the "float" indicating light, telling the operator that the ramp is in automatic "free-floating" position. In this position only the Up button will remove the ramp from automatic "float" since the limit switch 290 renders all circuits of the Down, In and Out solenoids inoperative and energization of conductor 298 activates the automatic float features 296 which may be deenergized only by means of opening switch 234 which, as heretofore described, opens only when the Up button is depressed.

It will be observed that the automatic float system will not be operative unless light 294 is lit. The automatic float system shown generally at 296 operates by means of a series of limit switches 300, 302, 304 and 306 and solenoids 236, 238, 282 and 284 which control the hydraulic valves 240, 242, 286 and 288 which, in turn, effect the raising and lowering of the bumper beam 96. The limit switches 300 and 304 are mounted near one end of bumper beam 96 (disposed to operate in conjunction with segment 12a) and limit switches 302 and 306 are mounted on the other end of the beam (disposed to operate in conjunction with segment 12g). The limit switches 300, 302, 304 and 306 are illustrated by small rectangles in FIG. 9. If limit switch 300 is released due to a rise in segment 12a it closes completing a circuit to solenoid 236 which is energized to open valve 240. At the same time when switch 300 closes switch 308 closes, completing a circuit to solenoid 218 starting motor 200 operating pump 208 to supply hydraulic fluid to one of the hydraulic cylinders 98 (nearest to segment 12a) but not the other cylinder 98 and the beam rises until it is ½ inch below the ramp (or whatever clearance the limit switch is pre-set to effect). At this point limit switch 300 is again encountered, deenergizing solenoids 236 and 218 turning off the pump motor 200 and hydraulic pressure to the hydraulic cylinder 98. If segment 12a moves downward toward the beam so that there is less than the ½ inch distance (or the pre-set distance) between the segment 12a and the beam 96, limit switch 304 is encountered and closed. This energizes solenoid 282 which controls down valve 286 which permits hydraulic fluid to escape from the one hydraulic cylinder 98 and allows that end of the bumper beam 96 to move downwardly until it is once more ½ inch below the segment 12a. At this point the limit switch 304 is released, deenergizing solenoid 282 which allows no more pressure to be released from the single hydraulic cylinder 98 and the beam remains stationary. It may be observed that limit switches 302 and 306 on the other end of beam 96 perform the same function as limit switches 300 and 304. If limit switch 302 and its accompanying switch 310 closes to energize solenoids 218 and 238 to operate valve 242 and extend the hydraulic cylinder 98 on the right hand side of the bumper beam 96 until the set spacing between the bumper beam 96 and the segment 12g is reached wherein the limit switch 302 (and switch 310) open to deenergize the solenoids 218 and 238 and stabilize the beam 96. On the other hand if the beam 96 comes too close to segment 12g the limit switch 306 is closed to activate solenoid 284 which (as shown in FIG. 11) opens valve 288 to permit a lowering of the beam until the proper limit (in this case ½ inch) is again attained whereupon the circuit is broken by the limit switch 306 and the beam is stabilized.

FIG. 9 shows the ramp 10 in its "free floating" position and in automatic operation with the segment 12a being higher than the segment 12g (see FIG. 9) and yet the bumper beam 96 maintains its proper spaced relationship to these segments. For the purpose of simplification lock legs 121 and associated components are omitted from FIG. 9. If the truck should accidentally pull away from the loading dock during loading operations the ramp 10 will drop onto the beam 96. The ramp can drop no more than the predetermined set distance (i.e. ½ inch).

When the truck has been loaded or unloaded, the operator again depresses the Up button. Depression of the Down, In or Out button has no effect for these push buttons are rendered inoperable when the ramp is in "free floating" position, as previously described. When the Up button is depressed relay 228 is again energized and, as previously described, this closes switches 230 and 232 to activate the solenoids 236 and 238 and raise the beam 96. Switch 234 opens simultaneously to insure deenergization of the automatic features 296 of the circuit that raises and lowers the ramp and assures that manual operation is complete. Also, as the beam 96 moves into contact with the ramp 10 limit switch 290 closes and reactivates the In, Out and Down buttons and simultaneously opens switch 292 to maintain deactivation of the automatic features 296 of the system after the Up button is released. In addition, the "float" light 294 goes out and all four pushbuttons are free to perform their associated functions.

The operator continues to depress the Up button until the ramp 10 is lifted away from the truck bed. At this point he releases the Up button to deenergize relay 228 and as previously described arrests further upward movement of the ramp.

The operator now depresses the In button closing switch 312 to energize solenoid 218 to supply hydraulic pressure and simultaneously closes switch 314 to energize solenoid 316. Solenoid 316, as shown by FIG. 11, throws slide valve 255 to the left so as to mesh passageway 318 with hydraulic line 258 and hydraulic line 262 to permit hydraulic fluid to flow out of rams 26 in back of the pistons 266 while passageway 320 meshes with hydraulic lines 268 and 226 to permit hydraulic fluid to flow into the front portion of the rams 26 and force the plungers 266 rearward. The effect is a retraction of the plungers 94 which, as previously described, retracts the sleeve members 38 of the segments 12 and an overall constriction of the length of the ramp 10. The operator continues to depress the In button until limit switch 322 opens breaking the circuit to solenoid 316 and causing the piston 256 of the valve 255 to retract to its original position shutting off the inlets and exits to rams 26. Limit switch 322 is mounted on either the sleeve members 38 or I beam members 28 and is disposed to contact a member (in the present instance flange 88) on the other such member so as to arrest the retraction of the sleeve members 38 preferably at a position where when the ramp is lowered the legs 121 will contact beams 123 and the ramp will be in its "at rest" position. The operator next depresses the Down push button energizing relay 279 which, as previously described, energizes solenoids 282 and 284 that operate valves 286 and 288 that lower the ramp. The ramp 10 moves downward until the lock legs 121 are in firm contact with the support beams 123. At this point limit switch 248 opens which once again permits only up movements from this the horizontal retracted or "at rest" position.

Limit switches 304 and 306 are closed when the ramp is in its "at rest" position but are inactive because the switch 292 is open. These switches remain closed when the ramp rises since the bumper beam 96 is in contact with them, however, switch 292 remains open until the bumper beam 96 falls free of the ramp whereupon the switch 292 closes activating the automatic features 296, however, at this time the switches 304 and 306 open and the ramp is under automatic control.

As an additional safety feature limit switch 324 is incorporated in the lock leg assembly. When a truck with a floor below dock level is being loaded, the loading ramp 10 is in a position such that it is extended and below dock level 18. If the operator raises the ramp only slightly and begins to retract it while the ramp is still below dock level, the legs 121 will come into contact with the beam 123 in its other than vertical position. Damage to the lock leg assembly or legs 121 may result, however, limit switch 324 is positioned to encounter one of the beams 123 to deactivate the relay 279 through switch 326 (mechanically linked to switch 324) and deactivate the Down circuit. Simultaneously the opening of switch 324 deactivates the In button. Thereafter the operator must move the ramp either out or up until the limit switch 324 is released. This feature assures that no damage can be done to the legs 121, the beams 123 or their associated components. The ramp cannot be fully retracted unless it is raised to a height slightly above the horizontal.

When the ramp 10 is elevated while the segments and beam 96 are in a position such as is shown by FIG. 9 (while the ramp is in automatic "free-floating") as controlled by circuit 296, since the elevating pressure originates from a single source (hydraulic line 226) the pressure in the cylinders 98 will equalize levelling the ramp. Such cylinders will equalize leveling the bumper beam 96 and hence, the ramp segments 12 as soon as the bumper beam contacts the segments 12 after the Up button is depressed.

The check valves 281 and 283 prevent the hydraulic cylinders 98 from lowering the ramp in case of failure of hydraulic pressure when the valves 240 and 242 are open.

An additional limit switch 325 (FIG. 10 only) is located in a manner to open when the sleeves 38 of the segments 12 are extended a predetermined distance. This switch deactivates solenoid 252 which, as previously described, causes the plungers 94 of cylinders 26 to extend. The switch prevents overextension or extension beyond the limits of the rams 26 and do not deactivate the In, Up or Down circuits.

It will be appreciated that the automatic features 296 are operated by means of the proximity of limit switches, mounted on bumper beam 96, to segments 12a and 12g and since a truck floor is substantially flat, the remainder of the segments will remain substantially within the predetermined distance of the bumper beam 96. However, it is obvious that such limit switches may be located on the bumper beam 96 so as to maintain such a predetermined distance between the beam 96 and other segments, such as segments 12b and 12f, however, the outermost segments are preferred. Also, it is obvious that other sensing means, such as photoelectric cells, may be employed in place of the limit switches, though limit switches are preferred.

I claim:

1. In a loading ramp having a segmented platform hinged to one edge of a loading dock, sleeve shaped members telescoped over said segments and disposed to slide in and out on said segments substantially uniformly so as to increase the length of said platform when extended, an elongated member positioned transversally beneath said segments disposed to engage said sleeve shaped members and raise or lower said platform when elevated or depressed, a first and second power means on a first and second ends of said elongated member disposed to raise and lower said elongated member, a third power means disposed to extend or retract said sleeve shaped members, the combination therewith of an electrical control system comprising:

(a) Up, Down, In and Out control means having a common current source;

(b) means for interrupting the current source to the Down, In and Out control means when said platform is substantially level and said sleeve shaped members are substantially retracted so that only the Up control means is operative, said means being further disposed to energize said In, Out and Down control means when said platform is elevated;

(c) actuating means disposed to energize said first and second power means to simultaneously elevate said elongated member when said Up control means is utilized;

(d) actuating means disposed to energize said third power means to extend said sleeve shaped members when said Out control means is utilized;

(e) actuating means disposed to energize said first and second power means to simultaneously lower said elongated member when said Down control means is utilized;

(f) automatic control means energized when said platform contacts a vehicle floor disposed to permit said elongated member to lower a predetermined distance beneath at least two said sleeve shaped members of said platform and to maintain said predetermined distance until said Up control means is utilized, said automatic control means comprising;

(f1) means for interrupting the current source to said Down, In and Out control means when said elongated member disengages said sleeve shaped members, said means being further disposed to energize said In, Out, and Down control means when said elongated member engages said sleeve shaped members;

(f2) a first sensing means positioned on said first end of said elongated member disposed to energize said first power means to lower said first end of said elongated member when at least one predetermined sleeve shaped member of said ramp comes within said predetermined distance from said elongated member, said first sensing means being further disposed to deenergize and stop said first power means whenever said predetermined distance is reattained;

(f3) a second sensing means positioned on said first end of said elongated member disposed to energize said first power means to raise said first end of said elongated member when said at least one predetermined sleeve shaped member exceeds said predetermined distance from said elongated member, said second sensing means being further disposed to deenergize and stop said first power means whenever said predetermined distance is reattained;

(f4) a third sensing means positioned on said second end of said elongated member disposed to energize said second power means to lower said second end of said elongated member when at least one second predetermined sleeve shaped member of said segmented platform comes within said predetermined distance from said elongated member, said third sensing means being further disposed to deenergize and stop said second power means whenever said predetermined distance is reattained;

(f5) a fourth sensing means positioned on said second end of said elongated member disposed to energize said second power means to raise said second end of said elongated member when said at least one second predetermined sleeve shaped member of said ramp exceeds said predetermined distance from said elongated member, said fourth sensing means being further disposed to deenergize and stop said second power means whenever said predetermined distance is reattained and (g) actuating means disposed to energize said third power means to retract said sleeve shaped members when said In control means is utilized.

2. In a loading ramp having a segmented platform hinged to one edge of a loading dock, an elongated member positioned transversally beneath said segments disposed to engage said segments and raise or lower said platform when elevated or lowered, a first and second power means on a first and second ends of said elongated member disposed to raise and lower said elongated member, the combination therewith of an automatic control system for maintaining said elongated member at a predetermined distance beneath said platform when the segments contact a vehicle floor comprising:

(a) a first sensing means positioned on said first end of said elongated member disposed to energize said first power means to lower said first end of said elongated member when at least one predetermined segment of said platform comes within said predetermined distance from said elongated member, said first sensing means being further disposed to deenergize and stop said first power means whenever said predetermined distance is reattained;

(b) a second sensing means positioned on said first end of said elongated member being disposed to energize said first power means to raise said first end of said elongated member when said at least one segment of said ramp exceeds said predetermined distance from said elongated member, said second sensing means being further disposed to deenergize and stop said first power means whenever said predetermined distance is reattained;

(c) a third sensing means positioned on said second end of said elongated member disposed to energize said second power means to lower said second end of said elongated member when at least one second predetermined segment of said platform comes within said predetermined distance from said elongated member, said third sensing means being further disposed to deenergize and stop said second power means whenever said predetermined distance is reattained;

(d) a fourth sensing means positioned on said second end of said elongated member disposed to energize said second power means to raise said second end of said elongated member when said at least one second predetermined segment of said ramp exceeds said predetermined distance from said elongated member, said fourth sensing means being further disposed to deenergize and stop said second power means whenever said predetermined distance is reattained.

3. In a loading ramp having a segmented platform hinged to one edge of a loading dock, sleeve shaped members telescoped over said segments and disposed to slide in and out on said segments substantially uniformly so as to enlarge the length of said platform when extended, an elongated member positioned transversally beneath said segments disposed to engage said sleeve shaped members and raise or lower said platform when elevated or depressed, a first and second power means on a first and second ends of said elongated member disposed to raise and lower said elongated member, a third power means disposed to extend or retract said sleeve shaped members, the combination therewith of an electrical control system comprising:

(a) a first limit switch positioned on said first end of said elongated member disposed to energize said first power means to lower said first end of said elongated member when one predetermined segment of said platform contacts said limit switch when it comes within a predetermined distance from said elongated member, said first limit switch being further disposed to deenergize and stop said first power means whenever it no longer contacts said segment;

(b) a second limit switch positioned on said first end of said elongated member being disposed to energize said first power means to raise said first end of said elongated member when said one predetermined segment of said platform releases said second limit switch and exceeds said predetermined distance from said elongated member, said second limit switch being further disposed to deenergize and stop said first power means whenever it contacts said segment;

(c) a third limit switch positioned on said second end of said elongated member disposed to energize said second power means to lower said second end of said elongated member when a second predetermined segment of said platform contacts said limit switch when it comes within said predetermined distance from said elongated member, said third limit switch being further disposed to deenergize and stop said second power means whenever it no longer contacts said segment;

(d) a fourth limit switch positioned on said second end of said elongated member disposed to energize said second power means to raise said second end of said elongated member when said second predetermined segment of said ramp releases said fourth limit switch and exceeds said predetermined distance from said elongated member, said fourth limit switch being further disposed to deenergize and stop said second power means whenever said predetermined distance is reattained and said fourth limit switch contacts said at least one second segment and
(e) means disposed to energize said third power means to extend and retract said sleeve shaped members.

4. In a loading ramp having a segmented platform hinged to one edge of a loading dock, sleeve shaped members telescoped over said segments and disposed to slide in and out on said segments substantially uniformly so as to enlarge the length of said platform when extended, an elongated member positioned transversally beneath said segments disposed to engage said sleeve shaped members and raise or lower said platform when elevated or depressed, a first and second power means on a first and second ends of said elongated member disposed to raise and lower said elongated member, a third power means disposed to extend or retract said sleeve shaped members, the combination therewith of an electrical control system comprising:
(a) a first sensing means disposed to energize said first power means to lower said first end of said elongated member when one predetermined segment of said platform comes within a predetermined distance from said elongated member, said first sensing means being further disposed to deenergize and stop said first power means whenever said predetermined distance is reattained;
(b) a second sensing means disposed to energize said first power means to raise said first end of said elongated member when said one predetermined segment exceeds said predetermined distance from said elongated member, said second sensing means being further disposed to deenergize and stop said first power means whenever said predetermined distance is reattained;
(c) a third sensing means disposed to energize said second power means to lower said second end of said elongated member when a second predetermined segment of said platform comes within a predetermined distance from said elongated member, said third sensing means being further disposed to deenergize and stop said second power means whenever said predetermined distance is reattained;
(d) a fourth sensing means disposed to energize said second power means to raise said second end of said elongated member when said second predetermined segment exceeds said predetermined distance from said elongated member, said fourth sensing means being further disposed to deenergize and stop said second power means whenever said predetermined distance is reattained and
(e) means disposed to energize said third power means to extend and retract said sleeve shaped members.

References Cited in the file of this patent
UNITED STATES PATENTS

| | | |
|---|---|---|
| 2,644,971 | Rowe | July 14, 1953 |
| 2,714,735 | Watson | Aug. 9, 1955 |
| 2,846,703 | Adley | Aug. 12, 1958 |
| 2,881,457 | Rodgers | Apr. 14, 1959 |
| 2,881,458 | Rodgers | Apr. 14, 1959 |
| 2,904,802 | Hartman | Sept. 22, 1959 |
| 2,993,219 | Pennington | July 25, 1961 |